United States Patent [19]
Roberts et al.

[11] Patent Number: 5,372,434
[45] Date of Patent: Dec. 13, 1994

[54] SPINDLE WITH LUBRICATION CHANNEL

[76] Inventors: Ron Roberts, 2621 Crestfield Dr., Valrico, Fla. 33594; Frank Potucek, 612-48th St. Ct. W., Palmetto, Fla. 34221

[21] Appl. No.: 237,640

[22] Filed: May 4, 1994

[51] Int. Cl.⁵ .......................................... F16C 17/12
[52] U.S. Cl. .................................. 384/391; 384/474; 384/537
[58] Field of Search ............ 384/391, 474, 389, 390, 384/397, 606, 537

[56] References Cited

U.S. PATENT DOCUMENTS

| | | | |
|---|---|---|---|
| 844,760 | 2/1907 | Symmonds | 384/389 |
| 1,190,079 | 7/1916 | Arthur et al. | 384/391 |
| 5,120,170 | 6/1992 | Kalies | 411/320 |
| 5,259,676 | 11/1993 | Marti | 384/474 |

*Primary Examiner*—Lenard A. Footland
*Attorney, Agent, or Firm*—Dominik, Stein, Saccocio, Reese, Colitz & Van Der Wall

[57] ABSTRACT

A cylindrical spindle for mounting a bearing or other member that requires lubrication, the spindle having an internal longitudinal passageway for conducting the lubricant to the bearing from an end of the spindle, and having a lateral passageway to receive a cotter pin for locking a nut on the spindle for retaining the bearing in place, the two passageways being nonintersecting with the lateral passageway extending substantially along a diameter of the cylindrical spindle and the longitudinal passageway being offset from the longitudinal axis of the cylindrical spindle.

20 Claims, 1 Drawing Sheet

SPINDLE WITH LUBRICATION CHANNEL

BACKGROUND OF THE INVENTION

1. Field of the Invention

The invention concerns wheel spindle and hub assemblies, preferably for use in a non-driven axle of an automobile or trailer, the assemblies including fastening means for securing a hub and anti-friction bearings on the spindle, and lubrication means for replenishing lubricant to the hub and bearings.

2. Description of the Related Art

Wheel spindle and hub assemblies are typically comprised of a spindle, one or more (typically two) antifriction bearings for rotatably supporting a hub, a hub, and lubrication means. Generally, wheel spindle and hub assemblies can be classified as either an oil lubricated or grease lubricated type.

In any grease lubricated wheel spindle and hub assembly, grease must be periodically added to make up for grease which is lost during normal operation. Further, grease should be routinely added in order to exchange grease which has been oxidized or has lost it's lubricating properties due to prolonged exposure to high temperature, contact with air, contacted with fresh or salt water, etc.

Typical grease-lubricated spindle assemblies are disclosed in U.S. Pat. No. 4,262,978 (Everett) and U.S. Pat. No. 5,259,676 (Marti), the disclosures of which are incorporated herein by reference. A longitudinal bore is drilled generally along the axis of the spindle beginning at one end and extending inward along the axis of the spindle shaft to a point generally transverse with the bearing, or in the case of two or more bearings, the outboard bearing. A grease fitting such as a zirk fitting is provided in communication with the longitudinal bore. A transverse bore is provided in communication with the longitudinal bore in the area of the bearing for providing grease to the bearing(s) and/or interior of the hub.

Such a construction permits the resupplying of grease without requiring disassembly of the wheel spindle and hub assembly. The grease spindle assembly also includes a passageway which vents the lubricating medium. Grease can be injected at the outboard end of the assembly using a conventional grease gun, and passes through the longitudinal bore along the axis of the spindle, then radially through the transverse bore, and into a lubricating cavity. As new grease is injected, older grease is displaced and caused to be expelled from the lubricating cavity through the vent passageway. This expulsion indicates that the hub and bearings are packed with grease. The vent passageway also allows the grease to purge any air trapped in the lubricating cavity.

Normally, the hub and bearings are mounted on the spindle and held in a preset relationship, i.e., the bearing preload adjustment, by a nut screwed onto the end of the spindle, engaging threads machined onto the outside surface of the spindle. In order to prevent rotation of the nut once the preload adjustment has been set, resort may be made to a retaining means comprising a castellated nut and a cotter pin or other type of pin which is inserted through a bore hole drilled laterally through the centerline of the threaded end portion of the spindle. There is a general familiarity with, and acceptance of, this system wherein the castellated nut is positioned by lining up a slot and hole on one side of the spindle with a slot and hole 180° on the other side of the spindle, and bending the cotter pin projections around the shaft. See, for example, U.S. Pat. No. 1,540,055 (Chilton).

Although there is general acceptance respectively of the lubrication supply system having an axial bore hole as a lubrication supply channel, and also of a hub retaining system comprising a castellated nut, retaining pin, and retaining pin bore hole drilled through the centerline of the spindle, a problem occurs when attempting to employ both systems at once. Namely, both the longitudinal axial lubricant bore hole and the lateral diametrical retaining pin would intersect, resulting in leakage of the lubricant out of the retention pin hole.

Attempts have been made in the past to construct a wheel spindle and hub assembly having a lubricant channel provided in the spindle, a nut for retaining the hub on the spindle, and a pin for retaining the nut in place on the spindle.

U.S. Pat. No. 5,259,676 solves the problem by providing the grease fitting and axial lubricating channel at the outboard end of the spindle, and a nut for retaining the hub and a D-washer with locking tabs for securing the D-washer at the inboard end. However, serviceability would be improved if both the grease fitting and the nut securing the hub were provided on the readily accessible outboard end of the spindle.

It is also possible to provide the D-washer and lubricating channel on the same axial end of the spindle, since the locking finger or tab of the D-washer can be constructed so as to not interfere with the grease fitting. However, the locking finger or tab is made of thin metal which is easily broken or sheared off during normal operation. Further, specialized replacement washers may not be readily available.

Another proposed solution is disclosed in U.S. Pat. No. 5,120,170, in which a cotter pin cordal passageway is provided spaced from the axial lubrication passageway extending along the longitudinal axis of the spindle. However, a disadvantage of such a solution is the requirement to plane or flatten the threaded surface, or take other steps, so that the bore for the cotter pin may be readily and accurately drilled. A further problem resides in the fact that the end of the axle, through which the axial lubrication channel bore must be drilled, usually presents a "nipple" at the center of the end face of the spindle, making positioning of the drill difficult and causing wandering of the drill tip. Yet a further problem with such a system is that the tangential cotter pin has an unconventional appearance, and thus requires an end user to overcome an initial unfamiliarity and mistrust.

In view of the foregoing, it is an object of the present invention to provide a novel hub and spindle assembly lubrication and fastener retention system which eliminates or minimizes the above-mentioned and other problems, limitations and disadvantages typically associated with conventional systems. It is a further object of the invention to design a system which is simple to manufacture, easy to use, inexpensive, and reliable. Still other objects will become apparent in the following description of the invention.

SUMMARY OF THE INVENTION

This invention relates to a spindle for a hub and bearing assembly, the spindle including means for lubricating and means for retention of the hub and bearing assembly.

The spindle is of a conventional design, including the provision of a conventional lateral passageway through the centerline of spindle near one end of the spindle for receiving a cotter pin or other retention pin therethrough to retain a lock nut on the spindle. The spindle of the present invention is modified by the provision of an eccentric or off-axis longitudinal passageway for conducting lubricant from one end of the spindle, first axially through to the interior of the spindle and then radially outwardly through a branch passageway to the outside surface of the spindle.

A surprising advantage of the construction of the present invention is that, since the point of entry of the drill is not the center of the axis, the drill engages a relatively flat segment of the axle end face, rather than the "nipple" which is often present.

A further advantage of the invention is that the cotter pin bore hole can be drilled through a perpendicular surface in the conventional manner, rather than tangentially as in U.S. Pat. No. 5,120,170. This eliminates the secondary operation required to render the spindle tangentially drillable.

A further advantage of the invention is that the off-axis longitudinal bore hole is necessarily closer to one of the spindle surfaces, so that the branch passageway (radial bore hole) need not extend all the way to the central axis of the spindle. The reduction in drilling results in an increase in strength.

A further advantage of the invention is that the assembly according to the present invention has a rather conventional appearance, with the conventional cotter pin passing through the centerline of the spindle and castellated nut in the customary and widely accepted manner. Such a design is not only more familiar, it is also easier to operate and safer to repair.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other spindle and hub assembly lubrication systems for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The features of this invention are best understood by reference to the attached drawings of the spindle and how it is used.

In a specific embodiment of the invention as shown in the figures the spindle may have a central body portion with the largest outside diameter of any portion of the spindle; an end portion having a smaller outside diameter, which end portion is threaded; and an intermediate portion connected to both the central portion and the end portion, and having an outside diameter between that of the central portion and that of the end portion. Shoulders are formed in the transition areas between these three portions.

In a preferred embodiment the spindle has a bearing mounted in the intermediate portion, and held in place by a washer and a castellated nut with a cotter pin retention means on the end portion tightening the bearing against the shoulder formed between the central portion and the intermediate portion.

Figure 1:
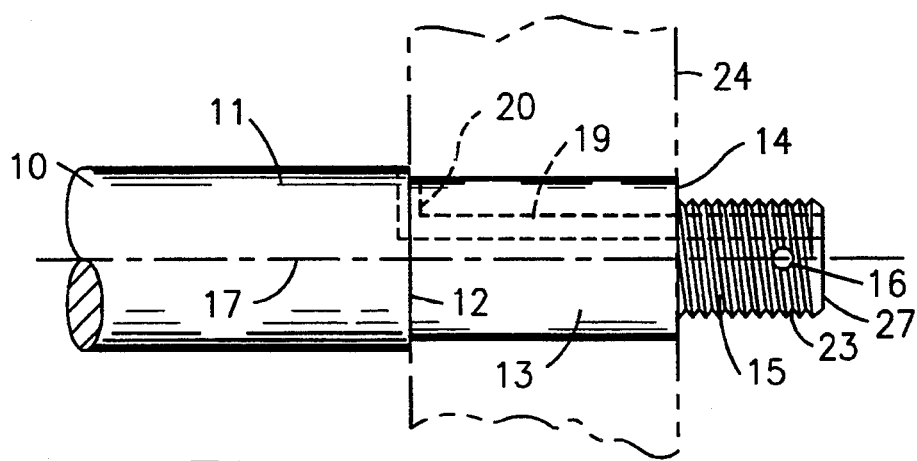
FIG. 1 is a front elevational view of the spindle of this invention.
Figure 2:
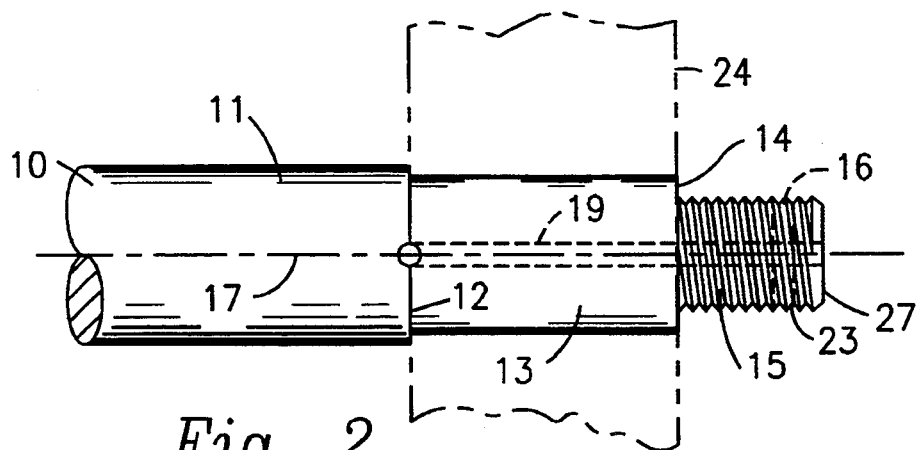
FIG. 2 is a top plan view of the spindle of this invention.
Figures 3, 4, 5:
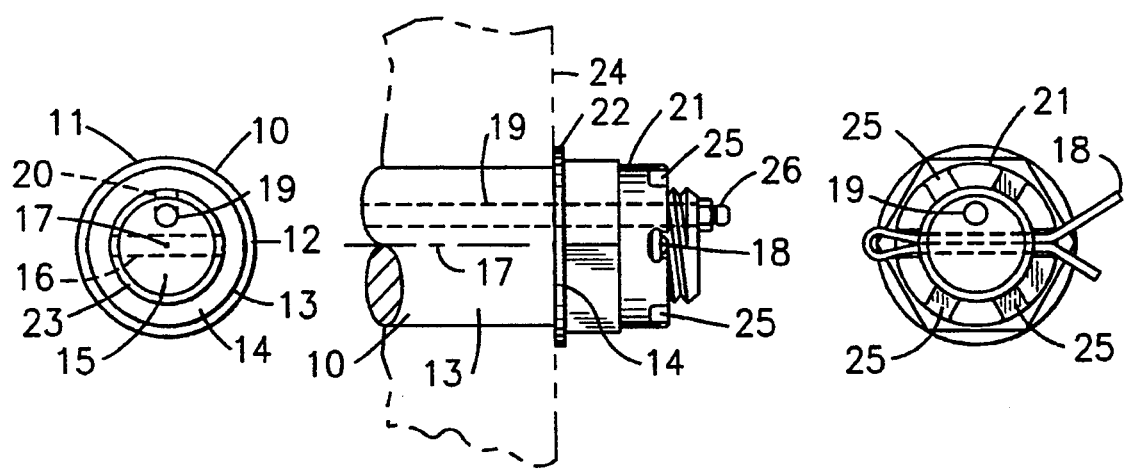
FIG. 3 is an end elevational view of the spindle of this invention.
FIG. 4 is an enlarged partial front elevational view of the spindle of this invention with a bearing mounted thereon and held in place by a washer and a castellated nut locked by a cotter pin.
FIG. 5 is an end elevational view of FIG. 4.

More specifically, in FIGS. 1–3 the spindle is shown to be a cylindrical rod that has been machined, drilled and tapped to produce the final design. Spindle 10 has a central portion 11, which represents the original rod from which the spindle has been prepared. The maximum diameter of spindle 10 generally is found in central portion 11, with the ends being the same or smaller in diameter. It is, of course, entirely possible that the end of spindle 10, not shown, (i.e. the left end of the spindles of FIGS. 1 and 2) is of greater diameter or other shape than that of central portion 11.

Central portion 11 terminates at shoulder 12, which transitions to intermediate portion 13 having a smaller outside diameter than that of central portion 11. Intermediate portion 13 extends from shoulder 12 to shoulder 14, which connects to end portion 15, having a smaller outside diameter than that of intermediate portion 13. End portion 15 is machined to provide external threads over the entire length of end portion 15. The result is a shaft with two stepped-down portions 13 and 15, and two shoulders 12 and 14. This is a typical structure, which, for example, is employed in mounting a bearing 24 on a shaft. Intermediate portion 13 has an outside diameter onto which bearing 24 may be pressed with the inward end of the ball bearing race fitting snugly against shoulder 12. The outer end of the ball bearing roll is pressed inwardly by tightening a nut engaged with the screw threads 23 on end portion 15.

All bearings require lubrication. In order to avoid the need to disassemble the assembly to perform lubrication, it is preferred that lubrication resupply means be built-in. A typical way of providing such lubrication is to provide a conduit, which connects a space adjacent to the balls or rollers of the bearing to the outside of the machine containing the bearings, so that a lubricant can be fed into the conduit and pressurized to flow onto the balls or rollers. Piping may be used for this purpose, but in this invention it is desired to use internal passageways drilled thorough the spindle 10. In FIGS. 1–3 there is a longitudinal hole 19 drilled from end wall 27 eccentric to and parallel to longitudinal axis 17 of spindle 10.

Longitudinal hole 19 penetrates to approximately the area of the bearings to be lubricated, such that a short branch conduit 20 can be drilled to connect the longitudinal hole 19 to the outside surface of spindle 10 hear to the balls or rollers of bearing 24. The conduit 19 connected to branch conduit 20 can then serve to direct pressurized lubricant from end wall 27 to bearing 24.

FIGS. 4 and 5 show a typical use for the spindle of this invention. Bearing 24 is mounted on intermediate portion 13. Washer 22 is placed over threads 23, and castellated nut 21 is screwed onto threads 23 and tightened to press bearing 24 snugly against shoulder 12. Castellated nuts preferably have six or more notches 25 in their structure for passage of a cotter pin 18 or other retention pin means to prevent loosening of castellated nut 21. The use of latter pin 18 or other retention pin means requires a passageway be drilled laterally thorough end portion 15. That passageway is shown as a bore 16. If, as in the preferred arrangement, cotter pin 18 is to engage diametrically opposite notches 25 for locking castellated nut, bore 16 must be diametrical (i.e., pass through the centerline of the circle described by the circumference of the outer diameter of the spindle). If lubrication conduit 19 were drilled along axis 17, diametrical bore 16 would be intersected and the pressurized lubricant in conduit 19 would leak out of bore 16. In this invention there is no intersection of conduit 19 and bore 16, because conduit 19 is not aligned on axis 17, but rather is eccentrically located specifically to avoid intersection with bore 16. Preferably conduit 19 would be modified by the attachment of a lubrication fitting 26, e.g., an Alemite fitting.

A significant advantage of the present invention is in the facilitation of the drilling of the holes for bore 16 and conduits 19 and 20. Drilling generally requires a flat surface perpendicular to the axis of the drill bit so that the bit can bite into the metal properly and in alignment. If the drill bit is applied to a surface not perpendicular to the axis of the bit, the tip of the bit may tend to slide down the slope before biting into the metal, and thereby product an imperfect hold. In some instances, such as in the construction shown in U.S. Pat. No. 5,120,170, the offsetting the cotter pin bore generates problems in the special efforts and requirements of drilling the hole tangential bore for the cotter pin. Further, the longitudinal bore in the center axis of the spindle is drilled by applying the drill tip to the point of a nipple which is commonly found in the center of the end face of a fabricated axle rod, so that non-planarity and drill bit wandering remain problems. In the present invention, on the other hand, each of holes 16, 19, and 20 is drilled without difficulty since the tip of the drill has no tendency to slide or wander; each hole is drilled on a radius or perpendicular to a flat surface. A further advantage of this invention is that branch conduit 20 is shorter than would be the case when lubrication conduit is an axial hole, resulting in less drilling requirement and a stronger axle construction.

The foregoing has described a cylindrical spindle for use with a bearing and a castellated nut. It is, of course, entirely possible to employ spindles wherein the same or all of the portions are other than cylindrical, wherein the material from which the spindle is made is other than metallic, and wherein there are more or less than two stepped-down portions on the end of the spindle.

The off-axis longitudinal bore hole is produced in the following manner.

Upon completing the spindle profile in a lathe operation the spindle shaft is clamped in a collect fixture which is offset to a dimension which allows both the longitudinal bore hole and the transverse cotter pin hole to be drilled without intersecting. The longitudinal hole is preferably drilled by means of a gun drill which utilizes high pressure coolant to extract the chips while drilling. Use of this type of drilling equipment does not require a conventional center drill as does a conventional twist drill. This is accomplished through high RPMs and low feed rates in conjunction with a precision drill bushing. The cotter pin hole is drilled by two opposing drills to eliminate a burr caused by the break out.

The threads are preferably put on the shaft by means of a three dye roll thread head which cold forms the threads. This method of thread production produces a superior quality thread as well as a stronger thread.

The intersecting lubricating channel (branch pathway) is drilled prior to the longitudinal hole so that the gun drill will ream the burr left by the intersecting hole drill. If the longitudinal hole were drilled first, there is the possibility that a burr may be left inside the shaft which could break free and possibly contaminate the bearing assembly.

Although the present invention was first designed as a means for providing a lubricating channel in a spindle of a trailer axle, it will be readily apparent that the invention is applicable to non-driven wheels of an automobile, boat shafts, heavy duty door hinges, etc., and it will be readily apparent that the invention is capable of use in a number of other applications. Although this invention has been described in its preferred form with a certain degree of particularity with respect to axle spindles, it is understood that the present disclosure of the preferred form has been made only by way of example and that numerous changes in the details of structures and the composition of the invention may be resorted to without departing from the spirit and scope of the invention.

Now that the invention has been described,
What is claimed

1. A spindle for receiving one or more bearings and a hub, said spindle having:
   a central longitudinal axis;
   an external cylindrical surface;
   an end wall;
   a transverse passageway through the diameter of said spindle adapted to receive a retention pin means therethrough;
   a longitudinal lubrication passageway within said spindle, parallel to but offset from said central longitudinal axis and nonintersecting with said transverse passageway for receiving retention pin means; and
   at least one branch lubrication passageway connecting said longitudinal lubrication passageway to the external surface of said spindle.

2. The spindle of claim 1, wherein said retention pin means is a cotter pin.

3. The spindle of claim 1, which additionally includes a grease fitting provided in communication with the longitudinal lubrication bore.

4. The spindle of claim 1, wherein said branch lubrication passageway connecting said longitudinal lubrication passageway to the external surface of said spindle is substantially transverse, substantially radial, and shorter in length than the radius of the spindle at which the branch lubrication passageway is provided.

5. The spindle of claim 4 wherein said first shoulder is generally medially between said transverse passageway through the diameter of said spindle adapted to receive a retention pin means therethrough and said branch lubrication passageway.

6. The spindle of claim 1 having a central portion having a first outside diameter, and end portion having a second outside diameter smaller than said first outside diameter, and an intermediate portion sandwiched between said central portion and said end portion and having an outside surface with a third diameter smaller than said first diameter and larger than said second diameter.

7. The spindle of claim 6 wherein said branch lubrication passageway perpendicularly intersects said outside surface of said intermediate portion, and extends radially inward to said lubrication passageway.

8. The spindle of claim 6 which includes a first shoulder formed between said end portion to said intermediate portion; and a second shoulder formed between said intermediate portion to said central portion.

9. The spindle of claim 1, including an outward threaded end and further including a castellated nut threaded inward for engagement with the spindle screw threads, and a cotter pin passing through said transverse passageway through the diameter of said spindle adapted to receive a retention pin means therethrough and engaging slots in said castellated nut.

10. A lubricating retention spindle comprising an elongated shaft having a longitudinal axis, an external surface, and an end wall substantially perpendicular to said axis, a diametral passageway extending laterally though said shaft and though said axis, adjacent to and substantially parallel to said end wall and adapted to receive a retention pin means therethrough a lubrication passageway means including a first branch passageway within said shaft extending substantially parallel to said axis offset from said diametral passageway, said first branch passageway extending from said end wall along said shaft to an internal terminus said lubrication passageway means including a second branch passageway connecting with said internal terminus of said first branch passageway to said external surface of said shaft remote from said diametral passageway.

11. The spindle of claim 10 wherein said retention pin means is a cotter pin.

12. The spindle of claim 10 which additionally includes a grease gun fitting disposed in said first branch passageway at said end wall.

13. The spindle of claim 10 wherein said shaft includes a first shoulder substantially parallel to said end wall and spaced therefrom, said outside surface of said shaft including external screw threads from said end wall to said first shoulder, said first shoulder being spaced a selected distance along said spindle from said end wall a greater distance from said end wall than said diametral passageway.

14. The spindle of claim 13 wherein said first shoulder is generally medially between said diametral passageway and said second branch passageway.

15. The spindle of claim 14 which additionally includes a castellated nut having internal screw threads engaged with said external screw threads, said nut having spaced slots therein and a pair of slots are adapted for general alignment with diametral passageway, and a cotter pin passing through said diametral passageway and said pair of slots in said nut.

16. The spindle of claim 10 wherein said shaft includes a central portion having a first outside diameter, an end portion adjacent said end wall having a second outside diameter smaller than said first outside diameter, and an intermediate portion contiguous between said central portion sand said end portion and having an outside third diameter smaller than said first diameter and larger than said second diameter.

17. The spindle of claim 16 wherein said second branch passageway intersects said outside surface of said intermediate portion, and extends radially inward to said first branch passageway.

18. The spindle of claim 16 which includes a first shoulder connecting said end portion to said intermediate portion, and second shoulder connecting said intermediate portion to said central portion.

19. The spindle of claim 18 wherein said second branch passageway intersects said outside surface of said intermediate portion closely adjacent said second shoulder to permit lubrication to said second shoulder.

20. The spindle of claim 10 wherein said first branch passageway is substantially equidistant from said diametral passageway and said external surface of said shaft.

* * * * *